United States Patent
Wang et al.

(10) Patent No.: US 12,334,068 B1
(45) Date of Patent: Jun. 17, 2025

(54) DETECTING CORRUPTED SPEECH IN VOICE-BASED COMPUTER INTERFACES

(71) Applicant: Amazon Technologies, Inc., Seattle, WA (US)

(72) Inventors: Di Wang, Seattle, WA (US); Deshen Wang, Redmond, WA (US); Lan Ma, Lake Forest Park, WA (US); Shu Wang, Bellevue, WA (US); Wenbo Yan, Redmond, WA (US); Prathap Ramachandra, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 300 days.

(21) Appl. No.: 17/956,003

(22) Filed: Sep. 29, 2022

(51) Int. Cl.
| | |
|---|---|
| *G10L 15/22* | (2006.01) |
| *G06F 40/279* | (2020.01) |
| *G10L 15/18* | (2013.01) |
| *G10L 15/26* | (2006.01) |

(52) U.S. Cl.
CPC ........... *G10L 15/22* (2013.01); *G06F 40/279* (2020.01); *G10L 15/18* (2013.01); *G10L 15/26* (2013.01); *G10L 2015/225* (2013.01)

(58) Field of Classification Search
CPC ......... G10L 15/22; G10L 15/18; G10L 15/26; G10L 2015/225; G06F 40/279
USPC .......................................................... 704/235
See application file for complete search history.

(56) References Cited

U.S. PATENT DOCUMENTS

| | | | | | |
|---|---|---|---|---|---|
| 6,151,576 | A | * | 11/2000 | Warnock | ................. G10L 15/26 704/235 |
| 2023/0223018 | A1 | * | 7/2023 | Xing | ....................... G10L 15/22 704/232 |

\* cited by examiner

*Primary Examiner* — Abul K Azad
(74) *Attorney, Agent, or Firm* — K&L Gates LLP

(57) ABSTRACT

Approaches are generally described for corrupted speech detection in voice-based computer interfaces. First input data including first audio data representing a user utterance may be received. First data representing the first audio data may be generated using a first encoder. First text data representing a transcription of the user utterance may be generated. Second data representing the first text data may be generated using a second encoder different from the first encoder. Third data may be generated by combining the first data and the second data. The third data may be sent to a classifier network trained to predict a relevant corruption state for speech processing inputs. The classifier network may determine that the first input data corresponds to a first corruption state.

20 Claims, 8 Drawing Sheets

| Annotation | | | Speech processing interpretation | | | |
|---|---|---|---|---|---|---|
| Corruption State | Transcription | Domain | ASR | NLU | Prediction | Corrected hypothesis |
| Corrupted | orange country <media speech> | Weather | order tea | Sh. | Corrupted | Non-Sh. |
| Corrupted | alexa water (()) <cross talk> | Not set | order | Sh. | Corrupted | Non-Sh. |
| Corrupted | (()) frozen two (()) <singing> | Video | order frozen two | Sh. | Corrupted | Non-Sh. |
| Corrupted | alexa bye bye <low voice> | Global | buy buy | Sh. | Corrupted | Non-Sh. |
| Uncorrupted | order me some soda | Shopping | order me some soda | Sh. | Uncorrupted | Sh. |
| Uncorrupted | tell me about my deliveries | Shopping | tell me about my deliveries | Sh. | Uncorrupted | Sh. |

FIG. 3A

DETECTING CORRUPTED SPEECH IN VOICE-BASED COMPUTER INTERFACES

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

BRIEF DESCRIPTION OF DRAWINGS

FIG. 3A depicts example results achieved using a corrupt speech detection component, in accordance with various aspects of the present disclosure.

DETAILED DESCRIPTION

Figure 1:
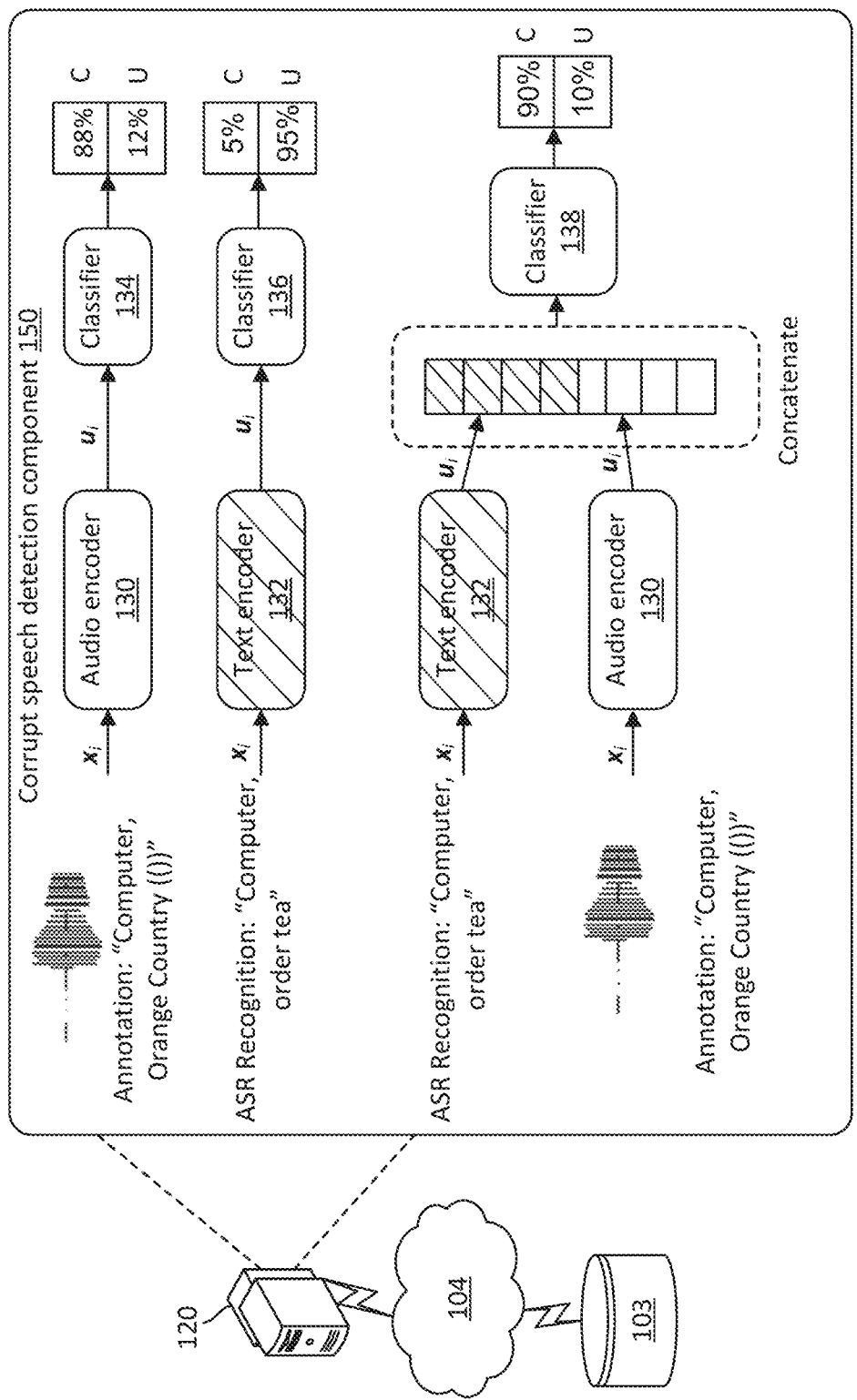
FIG. 1 illustrates a system including a corrupt speech detection component that may be used to detect corrupted speech input into a natural language processing system, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Voice-based and other natural language processing systems enable humans to use their voice and/or other natural language input (e.g., text, sign language, etc.) to perform computing tasks. Prior to such systems computer-human interfaces were limited to keyboard, mouse, push-button, touch screen, and/or other visual-based interfaces. Implementing a natural language-based human computer interface that enables a computer to understand not only the words that are said by the user, but also to determine the semantic meaning of those words and, in some cases, to perform actions in response to the natural language input is a highly challenging technical endeavor.

In general, natural language-based computer interfaces may be used for a variety of computing applications and in a variety of contexts, much in the same way that a keyboard can be used in any desired context. A few example contexts in which natural language based computer interfaces are used include voice-based search, voice-based question and answering systems, device control (e.g., "Alexa, turn on my television," "Alexa, play classical music in the living room," "Alexa, arm the security system," etc.), real-time transcription, data entry, and/or performing other tasks.

Natural language processing systems often have many different computer-implemented components that are used for different sub-tasks. For example, automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. In some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

Speech processing and natural language processing systems have improved over time, yet such systems are not as capable as a human at listening and communicating, especially when the input speech varies from the norms established for the particular system. When humans experience Spoken Language Understanding (SLU) difficulties in daily conversation, humans subconsciously identify the disfluency and express the reasons to the other person in the conversation. For example, a speaker in a conversation may explain disfluency to another person in the conversation by saying "I didn't catch that, could you say it again?" (e.g., for a hearing issue), or "I don't understand, could you explain it?" (e.g., for a comprehension issue). However, current computer-implemented natural language processing systems are unable to distinguish between the different reasons for disfluency and typically respond to a disfluency with a catch-all error response such as, "Sorry, I'm having trouble understanding right now. Please try a little later." Such a response may lead a user to think that the voice-based computer interface agent is having a comprehension issue, and may wait to repeat themselves or may abandon the conversation with the impression that the virtual assistant is incompetent even if the disfluency is due to corrupted audio input.

One of the main factors that results in speech processing failure is user-side speech corruption. For example, empirical data has shown that about 35% of user utterances over a past time period include predefined corruption tags, such as <garbled audio>, <cross talk>, <media speech>, <humming>, <low voice>, <singing>, <partial whisper>, etc. Such corruption tags may be used to highlight noises and non-textual information during human annotation of input utterance samples (for training various models used in ASR, NLU, NER, etc.). ASR models are optimized during training to achieve human-level accuracy in recognizing words in a speech. However, when the audio and/or the speech is difficult or impossible to transcribe even by human annotators, it is less likely the ASR system will be able to correctly recognize the word. For user speech that includes one or more corruption tags, the ASR model Word Error Rate (WER) is 60%, on average, which is about 6 times higher than the 10% average WER on speech deemed uncorrupted. Without clear speech, ASR models struggle to recognize the words correctly. Subsequently, the downstream operations, from natural language understanding to response generation, are impaired as they are built on top of the ASR system recognized text. In other words, the error propagates. As a result, many common metrics used to assess the quality of natural language processing systems (e.g., Customer Perceived Defect Rate (CPDR)) show that corrupted user speech is typically understood as having a significantly higher defect rate relative to uncorrupted speech.

Described herein are systems and techniques that are effective to detect corrupted speech in real time. Corrupted speech refers to speech that is associated with one or more corruption states such as <garbled audio>, <cross talk>, <media speech>, <humming>, <low voice>, <singing>, <partial whisper>, etc., when transcribed by a human annotator. A machine learning framework (e.g., corrupt speech detection component 150) is described below that predicts whether or not speech would be labeled as corrupted by a human annotator. In some examples, the corrupt speech detection component may predict a particular corrupt state (e.g., a particular corruption tag) from among a set of possible corruption states so that the specific reason for finding the input utterance as "corrupt" may be explained to the user for remediation. In other words, this may enable speech processing systems (e.g., voice-based computer interfaces) to explain to the user why the user's request was not understood with a high degree of specificity.

To model the corruption state, representations of the user speech are computed using both low-level acoustic information and high-level ASR lexical recognitions. This approach is beneficial as raw audio contains rich information that the ASR system-recognized text does not capture. Experimental results show that the multimodal mechanism achieves an absolute improvement of 6.1% in corrupted state prediction accuracy over text-based natural language modeling. The applicability of the corrupt speech detection component is illustrated through two example applications. The corrupt speech detection component may enable voice-based computer interfaces (e.g., virtual assistants) to have real-time diagnostic ability when interacting with users. In addition, the corrupt speech detection component may assist developers in identifying opportunities for enhancing the state of the art voice-based user experience.

In various other examples, few shot learning may be used to fine tune generative language models to classify input utterances as corrupt or non-corrupt and/or as intelligible or unintelligible (e.g., in some examples, corrupted speech may be a subclass of unintelligible speech) regardless of whether the speech would be classified by the corrupt speech detection component 150 as corrupt). Advantageously, this approach may avoid the need to maintain and train a fully-connected classifier layer and may be achieved using a relatively small training sample.

Building a noise-robust Spoken Language Understanding system has been a long-standing area of research. Generally, the focus has been on the treatment of noise signals in reducing the ASR system error; for example, by adding the speech enhancement component at the frontend of ASR, multi-condition (clean and noisy) ASR model training, and/or using a joint training framework to optimize speech enhancement and recognition simultaneously. However, under the typical cascade SLU architecture, where the ASR system is followed by a NLU model to infer the semantics from the recognized text, the ASR error caused by noise or speech corruption will be magnified. To overcome the error propagation problem, similar efforts on building noise-robust NLU models have shown performance improvements. This is achieved with the help of data augmentation techniques (such as exploiting ASR hypotheses), incorporating noise robustness in language representation learning, and/or adversarial training (such as considering ASR errors as input perturbations).

Although the ASR and NLU decoupled SLU framework allows faster iteration speed and easier maintainability, such disjoint modeling limits the unified SLU output optimization. Due to this constraint, some recent approaches have employed End-to-End (E2E) SLU models that directly map a speech audio input to SLU outputs. However, the E2E SLU framework is not yet deployable, due to its deficiency in dealing complicated user requests, system latency, and other issues.

The approaches discussed herein for corruption detection in input speech differ in that: (i) the task of user Speech Corruption Detection for SLU systems is defined and formulated to proactively identify fatal corruptions that could cause SLU errors; (ii) in the corruption state modeling, a multimodal approach is used that encodes both audio and text information from user speech; and (iii) the various approaches are well-suited for production use in an ASR/NLU decoupled SLU framework.

As used herein, user utterances, input text data, input speech, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable instructions) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" (sometimes referred to as "skills") may be any software (and/or combination of software and hardware) used during natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software and the Cortana system from Microsoft of Redmond, Washington, the Alexa system from Amazon.com, Inc. of Seattle, Washington, etc. Other examples of smart home devices and/or systems that may use the various device arbitration techniques described herein may include Google Nest Smarthome products from Google LLC, HomeKit devices from Apple Inc., etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device names, names of device groups, utterances, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword (e.g., a wakeword) or other triggering audio event is detected in the audio data. When a wakeword or other triggering audio event is detected, the speech processing enabled device may enter a "sending mode" in which audio detected by the microphones following the wakeword or other triggering audio event (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. For example, herein machine learning techniques may be used to determine substitute items for a given item. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. The words and/or tokens representing words and/or parts of words may be encoded into embedding data representing the words/tokens. These embeddings may be input into a transformer encoder along with positional embeddings describing a relative location of the words/tokens relative to one another.

In general, the encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. For example, for each input embedding the encoder layers may determine which parts of the token are relevant to other tokens received as part of the input data. Each encoder layer passes its token output to the next encoder layer. The decoder network of the transformer takes the tokens output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token is the dot product between $q_i$ and $k_j$. The attention weights are divided by the square root of the dimension of the key vectors, $\sqrt{d_k}$ which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 illustrates a system including a corrupt speech detection component 150 that may be used to detect corrupted speech input into a natural language processing system 120, in accordance with various aspects of the present disclosure. In various examples, one or more speech processing-enabled devices (e.g., smart phones, mobile devices, dedicated virtual assistant devices, etc.) may be local to a user. In some examples, the natural language processing system 120 may be deployed on such devices, while in other examples, such devices may be configured to perform speech processing locally. In still further examples, some components of natural language processing system 120 may be employed locally on a user-side device while other components may be executed by one or more remote devices. Such a hybrid architecture is discussed below in reference to FIG. 7. The devices of natural language processing system 120, and/or the user-side devices (not shown in FIG. 1) may be configured in communication with one another over one or more networks 104. The network(s) 104 may be, for example, a wide area network (WAN), such as the Internet, a local area network (LAN), and/or some combination thereof. In some examples, non-transitory computer-readable memory 103 may be configured in communication with one or more of the natural language processing system 120 and/or the speech processing-enabled devices over network 104. The non-transitory computer-readable memory 103 may store instructions that, when executed by one or more processors, may be effective to perform the various techniques described herein, including the various techniques performed by corrupt speech detection component 150.

In some examples, one or more speech processing-enabled devices may have speech processing capability. In various examples, such devices may include one or more microphones and may be effective to detect wakewords spoken by a user, or other triggering audio events. Audio recorded after wakeword detection (or another triggering event) may be sent to the corrupt speech detection component 150 and used to determine whether the input data (e.g., the input audio data representing the user utterance) pertains to a particular corruption state for which the corrupt speech detection component 150 has been trained to detect. Additionally, as described in further detail below, an ASR component of the natural language processing system 120 may predict text data representing a transcription of the input utterance in the audio data. The ASR text data may also be used by the corrupt speech detection component 150, as described below.

Generation of Ground Truth Data

Past user utterances (with all applicable user permissions) may be transcribed and/or annotated by human and/or automatic annotation services. Collectively, human and/or machine-based systems used to generate ground truth data are hereinafter referred to as data associates (DAs). During the transcription process, DAs listen to audio files of past user utterances and transcribe speech of such utterances. When DAs encounter audio segments that are difficult to understand, the DA may use special tags to denote the characteristics of that audio in textual format. An example list of such tags are described in Table 1, below. However, it should be appreciated that a different list of tags may be used in accordance with the desired implementation.

TABLE 1

| Example | Tag | Meaning |
|---|---|---|
| 1 | <tts> | Computer-generated speech |
| 2 | <ct> | Cross talk |
| 3 | [fp] | Filled pause |
| 4 | <ga> | Garbled audio |
| 5 | [hn] | Human noise |
| 6 | <hum> | Humming |
| 7 | <i> | List items |
| 8 | <lv> | Low Voice |
| 9 | <ms> | Media speech |
| 10 | . | Multiple speakers |
| 11 | [bg] | Non-device-directed speech |
| 12 | [neg] | Non-verbal "no" sound |
| 13 | [aff] | Non-verbal "yes" sound |
| 14 | <pws> | Partial whisper |
| 15 | [pause] | Pause of four or more seconds during speech |
| 16 | <sg> | Singing |
| 17 | other | Unidentifiable non-target language |
| 18 | =other= | Unidentifiable non-target language in a catalog entity |

TABLE 1-continued

| Example | Tag | Meaning |
|---|---|---|
| 19 | (( )) | Unintelligible speech |
| 20 | <ws> | Whisper |

The tags may be standardized and predefined. For example, <ct>(<cross talk>) may represent unintelligible overlapping speech from multiple speakers, <ms> (<media speech>) may represent vocalized sound originating from a media source like a TV, computer, radio, music device, etc.

The corrupt state ground truth label may be derived from the non-textual speech tags generated by DAs during annotation from user speech. A particular utterance (and/or the audio data that includes the utterance) may be labeled as corrupted when the utterance includes partial words, unintelligible device-directed (a voice query intended for the device) speech, and/or background speech. The uncorrupted state ground truth label may be applied to utterances that include only intelligible device-directed speech. The particular definition for corrupted speech may vary from implementation to implementation. For example, in a first example implementation if one or more of the tags <ct>, <ga>, or <ms> are detected, the utterance may be labeled as corrupted. In a second example implementation, if one or more of the tags <ga> or <ws> has been detected, the utterance may be labeled as corrupted. In still other examples, each tag may correspond to a different corruption state (with the uncorrupted state having its own tag and state). In such examples, a multi-class classifier may be used to predict the particular tags for an utterance and the utterance can be subjected to a decision tree or other set of rules or heuristics in order to determine how to classify the utterance and/or the appropriate action to take in response to the utterance.

Problem Formulation

The corrupt speech detection component 150 may use a supervised learning task to predict the corruption state of each input user utterance. Formally, the problem solved by the corrupt speech detection component 150 may be formulated as: given a set of user utterances $\{x_i\}i=1, \ldots, N$ and a corruption state label space $Y=[y_1, \ldots, y_C]$, where C denotes the total number of corruption state labels, the corrupt speech detection component 150 learns to map each utterance $x_i$ to its corruption state label $y_i$. In one example, the corrupt speech detection component 150 may be implemented as a binary-class classification problem ($y_1$ denotes the speech is Corrupted, $y_0$ denotes Supported/uncorrupted). However, as described above, the corrupt speech detection component 150 may be implemented as a multi-class classifier that may be used to predict a variety of granular corruption states, including the individual tags described above in Table 1. Cross Entropy loss may be used to train the corrupt speech detection component 150:

$$L = -\sum_{i=1}^{N} y_{i,c} \log(f(u_i))$$

$$u_i = emb(x_i)$$

where $y_{i,c}$ is an indicator for the class $y_c$ of utterance $x_i$ and $u_i = emb(x_i)$ is the encoded speech representation of $x_i$ (e.g., a vector representing the utterance). From the above loss function L and class probability scoring function $f(\cdot)$, it can be seen that the performance of the corrupt speech detection component 150 is largely dependent on the speech representations $\{u_i\}_{i=1,\ldots,N}$ and the modality of input $x_i$.

Modeling Approaches

Various modeling approaches are depicted in FIG. 1 that may be employed by corrupt speech detection component 150. In general, corrupt speech detection component 150 may comprise an input signal encoder and a classifier (e.g., a light way classifier comprising a relatively few number of layers and/or parameters).

Audio-Based Model

In a first example depicted in FIG. 1, the corrupt speech detection component 150 may use an audio encoder 130 that may encode audio data representing the utterance. The audio encoder may comprise, for example, a recurrent neural network (RNN) (e.g., an RNN-T teacher model), a transformer-based audio encoder, a neural network, an autoencoder (e.g., a variational autoencoder), etc. In general, the audio encoder 130 may take raw audio data (e.g., a .WAV file, mp3 file, etc.) of speech as input and may generate embedding data comprising a numerical representation of that audio data (e.g., a vector). Stated another way, the input for the audio encoder may be user speech in the form of raw audio wave $x_i$, and the output of the audio encoder 130 may be an audio embedding vector $u_i$, which embeds audio information into a low dimensional vector $u_i$. The audio embedding vector may then be input into a fully-connected layer $f(\cdot)$ (e.g., classifier 134) for corruptness label classification. In the example of FIG. 1, the output layer may have two nodes, one for "corrupted" and one for "uncorrupted." However, as previously described, there may be separate nodes in the output layer for each corrupt state (including the uncorrupted state). Using an audio encoder as opposed to a text encoder may be beneficial as audio may include rich information that ASR recognized text may not capture, which may be important in detecting user speech corruption.

Text-Based Model

In text-based classification, transfer learning using pre-trained language models may perform well for various NLP tasks. The corrupt speech detection component 150 may use a text encoder 132 that may encode system-recognized text (e.g., ASR generated text). The text encoder may comprise, for example, a pre-trained transformer-based language model such as bidirectional encoder representations from transformers (BERT), bidirectional auto-regressive transformers (BART), and/or other transformer based language models, RNNs, LSTMs, etc. The input for the BERT model (or other text encoder 132) is the user speech in the form of ASR system recognized text $x_i$. The text encoder 132 outputs a text embedding vector u; that is, in turn, input into a fully-connected layer $f(\cdot)$ (classifier 136) to project the vector into corruptness label $y_i$. Accordingly, the text-based model uses ASR predicted transcriptions of speech to generate a corruption state label, since human transcriptions are not available during runtime.

Text-Audio Fusion Model

As shown in FIG. 1, a multi-model approach may be employed in which the corrupt speech detection component 150 uses an audio encoder 130 to encode raw audio of the input speech $x_i$ as well as text encoder 132 to encode ASR-recognized text of the input speech $x_i$. Each encoder generates its respective output embedding vector $u_i$. These vectors may be combined (e.g., by concatenating the two vectors) and input into a fully-connected classifier 138 trained as described above.

Text-ASR Signal Model

Although, not shown in FIG. 1, corrupt speech detection component 150 may use ASR-related features for corruptness classification. For example, ASR component 250 (FIG. 2) may generate a signal-to-noise ratio (SNR) (e.g., data representing the SNR) and a per-ASR hypothesis confidence score. Similar to the text-audio fusion model, a vector representing the SNR data and a vector representing the per-ASR hypothesis confidence score may be concatenated or otherwise combined (e.g., via vector addition) with a text embedding vector generated by text encoder 132. The combined vector may be input into a classifier trained to predict the corruption state label $y_i$. This approach may be beneficial to determine whether the audio embedding generated by the audio encoder 130 has more information beyond what is provided in the SNR data and the ASR hypothesis confidence score (by comparing the performance levels of the Text-ASR Signal Model to the Text-Audio Fusion Model).

Speech Corruption Detection

The relative performances of the Audio-based Model, the Text-based Model, the Text-Audio Fusion Model, and the Text-ASR Signal Model are evaluated using historical speech data (with all applicable user permissions).

Results

Table 2 presents the evaluation results across all model configurations compared to a baseline setup. Accuracy and F1 are measured with 0.5 threshold over the classifier's output probability.

TABLE 2

Accuracy and F1 Results for Modeling Approaches

| Model | Accuracy | F1 |
|---|---|---|
| baseline (all uncorrupted) | 59.19% | 44.01% |
| Audio-based | 69.70% | 68.95% |
| Text-based | 65.23% | 63.58% |
| Text-Audio-fusion | 71.33% | 70.78% |
| Text-ASRsignal | 68.07% | 67.40% |

As shown in Table, 3, the Text-Audio-fusion model of corrupt speech detection component 150, which includes speech in both acoustic and textual form, outperforms all other model settings for the test set. For example, 70.78% F1 was obtained using the Text-Audio-fusion model compared to 44.01% in current production setting (baseline) and 63.58% using text. Audio-based model, which takes only user speech audio as input, performs significantly better than Text-based model, by an absolute value of 4.48% in Accuracy and 5.38% in F1. This suggests that audio signals contain information that ASR system transcribed text could not capture, which is especially useful for user speech corruption detection. Furthermore, the Text-ASRsignal model results in a lower Accuracy and F1 in compare to the Text-Audio-fusion model. This observation affirmed the hypothesis that speech audio covers more information than ASR signals like SNR ratio and/or ASR confidence score. However, the other modeling approaches may be used in accordance with the desired implementation.

User Speech Corruption Detection in Real Time

In this application, the impact of using corrupt speech detection component 150 to improve user experience for a voice-based computer interface in real time. Given the domain-decoupled system setup, domain developer teams have the most control over the user request being routed into the corresponding speech processing domain. Accordingly, as a starting point, the corrupt speech detection component 150 is applied as an additional filter for user requests routing decision in a particular domain (e.g., music, video, shopping, general, etc.).

Speech Corruption and User Perceived Defect

First, the relationship between corrupted speech and the Customer Perceived Defect Rate (CPDR) (a known metric for examining the quality of natural language processing systems) is examined. CPDR is a user experience metric that indicates whether users are having defective experience in their interactions with a voice-based computer interface (e.g., such as the Alexa virtual assistant). The higher the CPDR, the more friction in the user experience. It has been seen that, from a first domain over a predefined past time period, the average CPDR on corrupted customer speech is 59.88%, whereas the number is 37.80% on uncorrupted speech. Using hypothesis testing, two-sample proportions one-tailed z-test shows p-value <α (with 0.001 significance level), the CPDR on Corrupted speech is significantly higher than on Uncorrupted speech.

Examining the speech characteristics presented in Table 3, despite the corruption, it may be beneficial (in terms of CPDR) to act on available information when NLP is able to capture part of the user speech. With the partial information, the NLU system is able to infer the user's intention and provide the desired experience accordingly. Specifically, when the ASR system recognizes more words, and the words recognized contain Domain-specific Carrier Phrases (e.g., for a shopping domain, phrases including "order", "show", "shop" and "buy" or for a music domain, phrases including "play", "pause", "turn up", "turn down", "skip", etc.), the more likely the natural language processing system can take a correct guess. However, if ASR text contains an Item-Name, the noun is more likely to be recognized incorrectly, leading to the speech being more likely to be in a defect state with a bad user experience.

TABLE 3

CPDR and speech characteristic on corrupted/uncorrupted customer speech.
Statistically significance is marked by ***,
word count feature using t-test with p-value <0.001; contain ItemName,
carrier phrase feature using two-sample proportion test with p-value <0.001.

| Corruption State | CPDR | Defect State | ASR text average word count | ASR text contain ItemName | ASR text contain Carrier Phrase |
|---|---|---|---|---|---|
| Corrupted | 59.88% | Non Defect | 4.3818 *** | 54.06% *** | 46.39% *** |
|  |  | Defect | 3.9974 *** | 59.01% *** | 42.07% *** |

Example Results

Data from the test set that has runtime hypothesized domain being a first domain is selected. The corrupt speech detection component 150 is run on this selected data to simulate a production environment. As discussed previously, when ASR is able to recognize part of the user speech, the natural language processing system has a better chance of inferring the user's intention correctly regardless of the corruption state. So to flag "Corrupted" speech, an additional, optional rule may be added to check for ASR text word count 4 (or another suitable threshold word count) after the corrupt speech detection component 150 output.

Getting a user request into the correct domain is the critical first step for natural language processing to provide a frictionless user experience. Accordingly, after the corrupt speech detection component 150, the evaluation may be continued for domain classification. It has been observed that corrupt speech detection component 150 detected 21.59% of the 43,527 user speech routed into a first domain as "Corrupted." Based on human annotated domain label, 73.29% of the detected "Corrupted" requests are actually not related to the first domain. This portion account for 30.59% of Falsely Accepted customer request in the first domain in the test set.

To illustrate the effectiveness of corrupt speech detection component 150, six examples of input speech are shown in FIG. 3A. For instance, the corrupt speech detection component 150 successfully detected the corruption when there is media speech (e.g., output by a media device such as a television, etc.) mixing together with the user speech of "Orange County" and re-hypothesize this request to be "Non-Shopping" related (whereas the speech processing interpretation routed this request to the Shopping ("Sh.") domain). Similarly, user speech of "frozen two" mixing together with singing was re-hypothesized from shopping domain to non-shopping.

Voice-Based User Interface

The current handling of a corrupted user speech instance is shown in Table 4. The response is either not reflecting the true cause of the speech processing failure or is directly providing the user the experience based on the (mis)interpreted intention. However, the corrupt speech detection component 150 may be used to provide a new clarifying response that is directly related to the corruption state. Instead of using the existing responses, the corruption in user's speech may be proactively identified and the cause of the failure may be explained to the user (e.g., "I didn't hear you clearly"). The user may be prompted to remove the noise and try again. In this way, the speech processing system's ability to correctly understand the users' requests is decoupled from clearly hearing what the user is saying. Hopefully, following the appropriate prompt the speech processing system will be able to properly hear and interpret the follow-up user request and surface the desired experience. The prompt may, for example, request clarification from the user and/or remediation of the acoustic environment to prevent corrupted audio.

TABLE 4

| Current UX: | Proposed UX: |
|---|---|
| Error response: | Disambiguation response: |
| "I'm having trouble understanding right now." | "I didn't hear you clearly, can you please try again?" |
| "Sorry, I'm not sure." | "Hmmm, I didn't catch that." |
| Or directly provide Domain-specific response: | Or disambiguation with Shopping confidence: |
| "Showing items matching [user request]." | "I didn't hear you clearly, were you trying to play music?" |
| "Playing [song] by [artist]." |  |

Corruption Detection in Automatic UX Quality Metrics

In this application, the corrupt speech detection component 150 is used to generate insights into current user experiences. An automatic user experience (AUX) model may use user experience metrics and Root Cause Analysis (RCA) that help system owners to monitor user experience quality and find the root causes for defects. The automatic RCA model attributes defects into ASR error, NLU error, and result error. AUX metrics and attribution models are offline models finetuned on a pre-trained transformer based language model that utilizes previous turns and following turns' contexts information as input. The attribution models learn from the interaction between users and the speech processing system, and mimic the human evaluation process. By replacing human evaluation, AUX significantly reduces annotation cost, speeds up the turn around time, and provides visibility on defects from tail utterances.

The existing Automatic RCA model considers corrupted utterances as part of ASR error. However, when the source of speech corruption comes from user side, the ASR team cannot do much to improve on ASR errors in the corrupted speech. To help the ASR team identify solutionable ASR errors, the corrupt speech detection component 150 may be used to filter out corrupted input speech.

Figure 2:
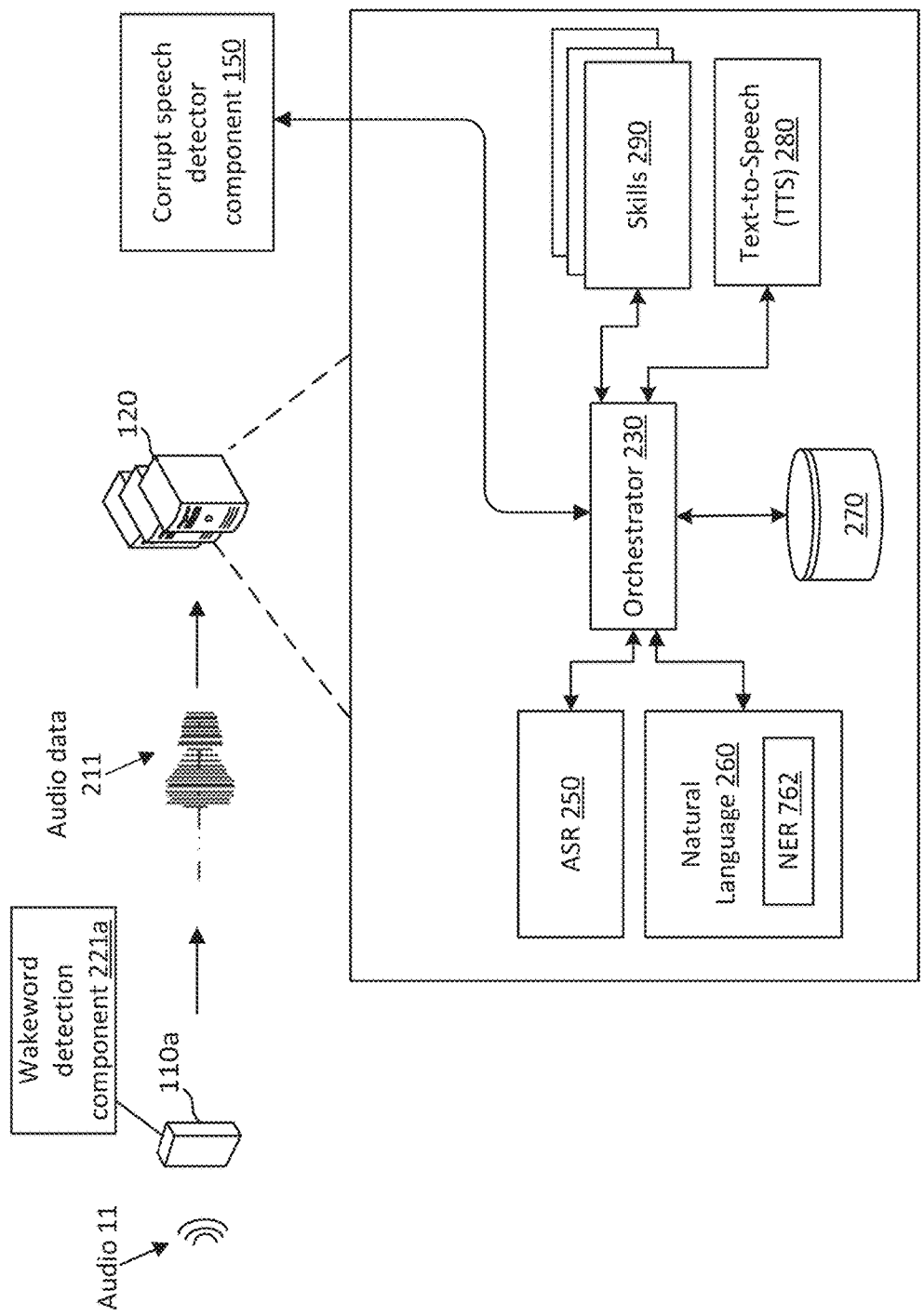
FIG. 2 is a block diagram of various components of a natural language processing system that may be used in accordance with various aspects of the present disclosure.

FIG. 2 is a block diagram of various components of a natural language processing system 120 that may be used in accordance with various aspects of the present disclosure. Although not necessarily limited to such, the natural language processing system 120 may operate using various natural language processing components as described in FIG. 2. The various components may be located on same or different physical devices. For example, natural language processing system 120 may be executed wholly or in part by one or more natural language processing-enabled devices 110a and/or one or more other computing devices. Communication between various components may occur directly or across a network(s). For example, ASR output data (e.g., text data representing a current utterance) output by ASR component 250 may be used to determine an intent of the utterance by natural language component 260. Thereafter, orchestrator component 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the devices 110a (e.g., a network-connected device that is enabled with natural language processing capability), captures audio 11. The device 110a may process the audio data, representing the audio 11, to determine whether speech is detected. The device 110a may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic and/or language models in storage, which acoustic models may include models corresponding to speech, noise (e.g., environmental noise or background noise), or silence. Still other techniques may be used to determine whether speech is present in audio data.

Once speech is detected in audio data representing the audio 11, the devices 110a may use a wakeword detection component 221a to perform wakeword detection to determine when a user intends to speak an input to the device 110a. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword.

The wakeword detection component 221a may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221a may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may begin sending audio data 211, representing the audio 11, to the natural language processing system 120. The audio data 211 may include data corresponding to the wakeword, or the portion of the audio data 211 corresponding to the wakeword may be removed by the device 110a prior to sending the audio data 211 to the natural language processing system 120.

Upon receipt by the natural language processing system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

As shown in FIG. 2, the natural language processing system 120 may include and/or be configured in communication with corrupt speech detection component 150. Accordingly, the raw audio data 211 and/or the ASR recognized text representing the utterance included in the audio data 211 may be sent to the corrupt speech detection component 150. As described above, the corrupt speech detection component 150 may classify the input utterance as pertaining to a particular corruption state. Various downstream actions of the natural language processing system 120 may ingest the predicted corruption state and the resulting action may be affected by the predicted corruption state. In some examples, a prompt may be generated by the text-to-speech (TTS) component 280 to prompt the user to repeat the utterance, depending on the applicable corruption state. In various other examples, if a portion of the utterance can be understood and/or an intent that is specific to a particular domain can be understood, but the utterance as a whole, or a portion of the utterance is corrupted, the output response may clarify the requested action. For example, TTS component 280 may output, "I'm having trouble hearing you, were you trying to play a song?" if the input utterance was partially understood as "Alexa, play (( ))<garbled audio> by [Artist]." It should be appreciated that these are merely examples of how a predicted corruption state may be used. Accordingly, the particular use of the corruption state labels output by the corrupt speech detection component 150 may vary according to the desired implementation.

The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated. In various examples, one or more of the ASR hypotheses may be sent to the voice-to-text natural language generation system 225 which may transform the ASR hypotheses into a like number of web-based queries having semantic fidelity to the ASR hypotheses so that the user question is optimized for further processing by the natural language processing system 120.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110a, the natural language processing system 120, etc.) to execute the intent. For example, if the text data corresponds to "call John," the NLU component 260 may determine an intent that the system establish a two-way communication channel between the device 110a originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data "Artist X" in the example request.

The NLU component 260 outputs NLU results to the orchestrator component 230. The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill 290. As described herein, in various examples, the skill component 290 may execute a capability runtime service (CRS) which may call a target determination component (not shown) for determining a device that may be targeted for the requested action/output. If the NLU results include multiple NLU hypotheses, the orchestrator component 230 may send a portion of the NLU results corresponding to the top scoring NLU hypothesis to a skill 290 associated with the top scoring NLU hypothesis.

A "skill" or "skill component" may be software running on the natural language processing system 120 that is akin to a software application running on a traditional computing device. That is, a skill component 290 may enable the natural language processing system 120 to execute specific functionality in order to perform one or more actions (e.g., provide information to a user, display content to a user, output music, or perform some other requested action). The natural language processing system 120 may be configured with more than one skill component 290. For example, a weather skill component may enable the natural language processing system 120 to provide weather information, a ride sharing skill component may enable the natural language processing system 120 to schedule a trip with respect to a ride sharing service, a restaurant skill component may enable the natural language processing system 120 to order food with respect to a restaurant's online ordering system, a communications skill component may enable the system to perform messaging or multi-endpoint communications, etc. A skill component 290 may operate in conjunction between the natural language processing system 120 and other devices such as the device 110a or a gateway system in order to complete certain functions. Inputs to a skill component 290 may come from various interactions and input sources. A skill component may include a communications skill component 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 120 (as illustrated in FIG. 2) or may be located at whole (or in part) with one or more separate systems. Unless expressly stated otherwise, reference to a skill, skill device, or skill component may include a skill component operating within the natural language processing system 120 (for example as skill component 290) and/or skill component operating within a system separate from the natural language processing system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any preconfigured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 120 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 120 may be executed wholly or partially by device 110*a*.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, settings, and the like. The system and techniques can be implemented on a geographic basis to ensure compliance with laws in various jurisdictions and objects in which the component(s) of the system(s) and/or user are located. Permissions may be obtained from a user associated with the device 110*a*, or other devices discussed herein.

Figure 3B:
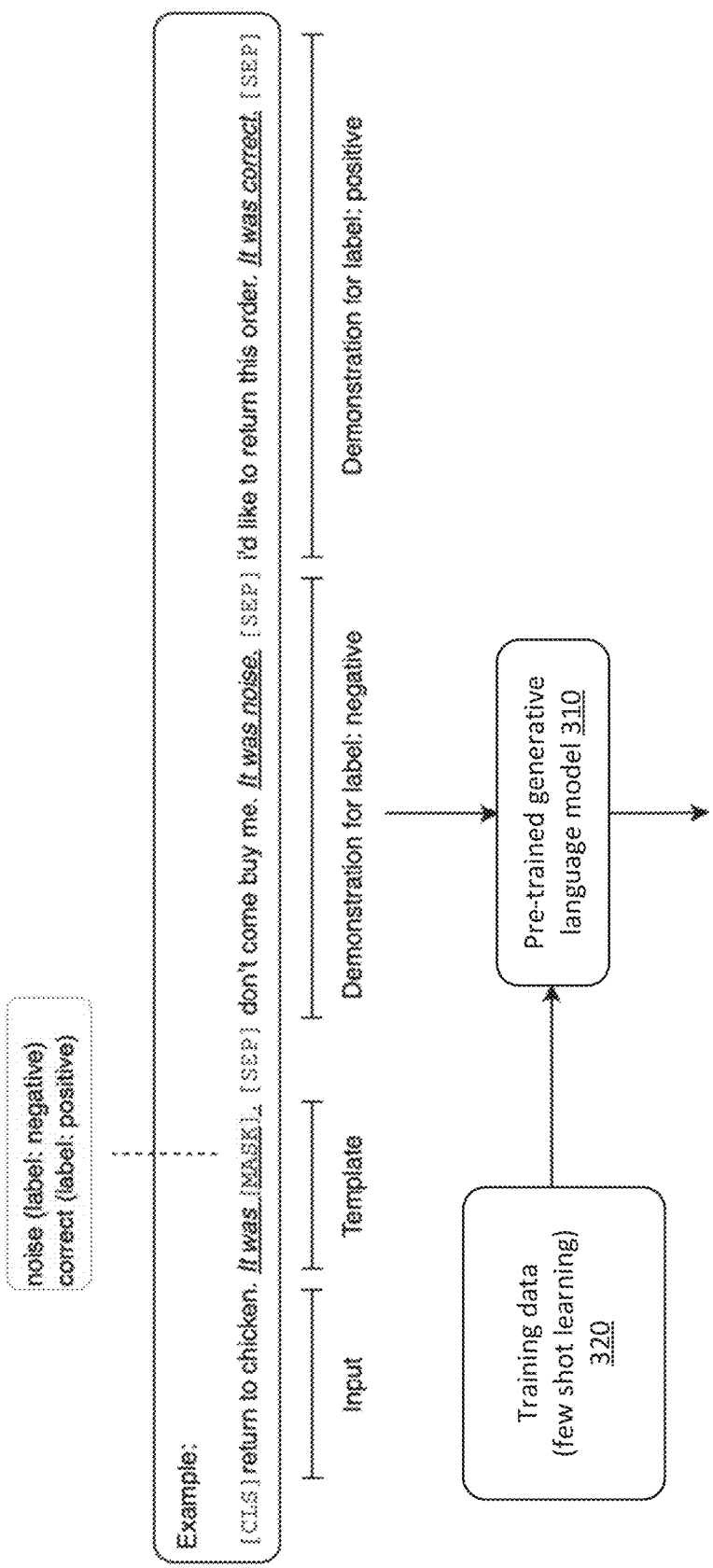
FIG. 3B depicts an example technique for detecting unintelligible natural language inputs using few shot learning, in accordance with various examples described herein.

FIG. 3B depicts an example technique for detecting unintelligible natural language inputs using few shot learning, in accordance with various examples described herein. However, the few-shot learning techniques described herein may also be used to classify input utterances as "corrupt" or "non-corrupt" depending on the desired implementation. A broader class of utterances that is inclusive of the corrupted utterances described above may be referred to as "unintelligible" utterances. Unintelligible utterances may be those utterances that cannot be processed by the natural language processing system either due to the quality of the audio (e.g., due to noise as in some of the examples of corrupted speech described above) or due to the content of the ASR-recognized speech. In fact, unintelligible utterances are typically unable to be understood even by a human annotator. Described herein is a system that may be used to classify utterances as unintelligible (or intelligible) based on a limited training sample using few shot learning approaches.

Unintelligible utterances are often nonsensical and typically exhibit very different text pattern relative to true request utterances. Typically, unintelligible utterances do not make semantic sense, and tokens or phrases in such utterances are often those tokens or phrases that usually do not appear together. For example, consider the example unintelligible phrases "return to chicken", "i'm not don't come buy me". Pre-trained generative language models may be used to detect nonsensical unintelligible utterances that signal-based models may be unable to detect.

The generative pre-trained transformer-3 (GPT-3) achieves remarkable performance using a natural language prompt and a few task demonstrations as the input context. Such, pre-trained language models (e.g., GPT-3, GPT-2, T3, BERT, etc.) may be used, after fine-tuning, to predict unintelligible phrases. Only examples/demonstrations that are semantically close to the target utterance are sampled as demonstrations, based on the SBERT model. When inferencing a new utterance, the positive and negative demonstrations are first obtained by finding the nearest neighbor in the training data's positive set and negative set. In the examples below, "don't come buy me" and "I'd like to return this order" are not randomly selected, they are selected because they are the most semantically close utterances to the target input utterance.

To formulate a binary classification problem (e.g., intelligible/unintelligible) into a language modeling problem, no linear layer is needed for a downstream classification task. Instead, a prompt is used with a mask token (i.e., the token [MASK] representing a masked term) masking one of the words. The pre-trained generative language model (e.g., GPT-2, GPT-3, SBERT, BART, etc.) may then be used to predict the masked word.

An example of such a pre-trained generative language model 310 that is used to identify intelligible/unintelligible utterances (or corrupt/non-corrupt utterances) is shown in FIG. 3B. The example template for using the pre-trained generative language model 310 for identifying intelligible/unintelligible utterances may be:

[CLS]{UTTERANCE}. it was [MASK][SEP]{POSITIVE DEMONSTRATION} it was correct. [SEP]{NEGATIVE DEMONSTRATION}. it was noise. [SEP]. The pre-trained generative language model 310 is thus trained (fine-tuned) on a limited sample (e.g., training data 320) to predict whether input phrases are intelligible (e.g., where the [MASK] token is replaced with "correct") or unintelligible (e.g., where the [MASK] token is replaced with "noise"). The pre-trained generative language model 310 has shown high levels of performance when training using only a few hundred samples.

In the example of FIG. 3B, the input to the pre-trained generative language model 310 is:

[CLS] return to chicken. it was [MASK]. [SEP] don't come buy me. it was noise. [SEP] play classical music. it was correct. [SEP]

And the output is:

[CLS] return to chicken. it was noise. [SEP] don't come buy me. it was noise. [SEP] play classical music. it was correct. [SEP]

Accordingly, the pre-trained generative language model has correctly identified that "return to chicken" is unintelligible.

Figure 4:
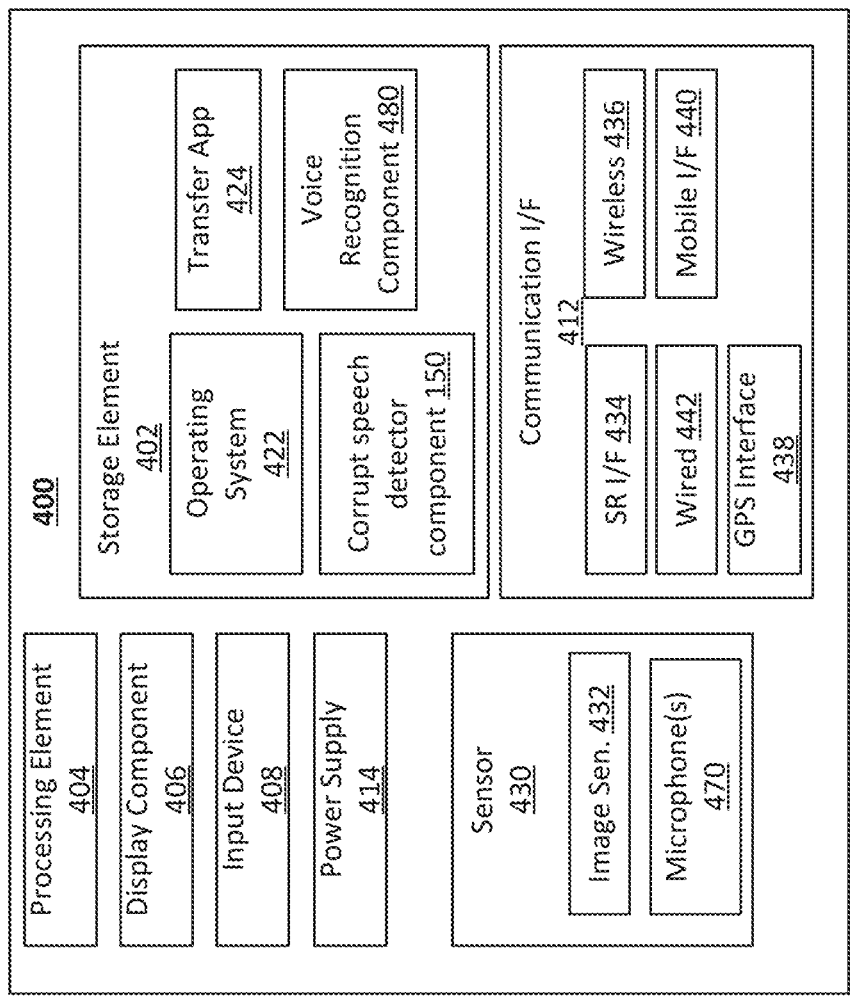
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400.

The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise the corrupt speech detection component 150.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
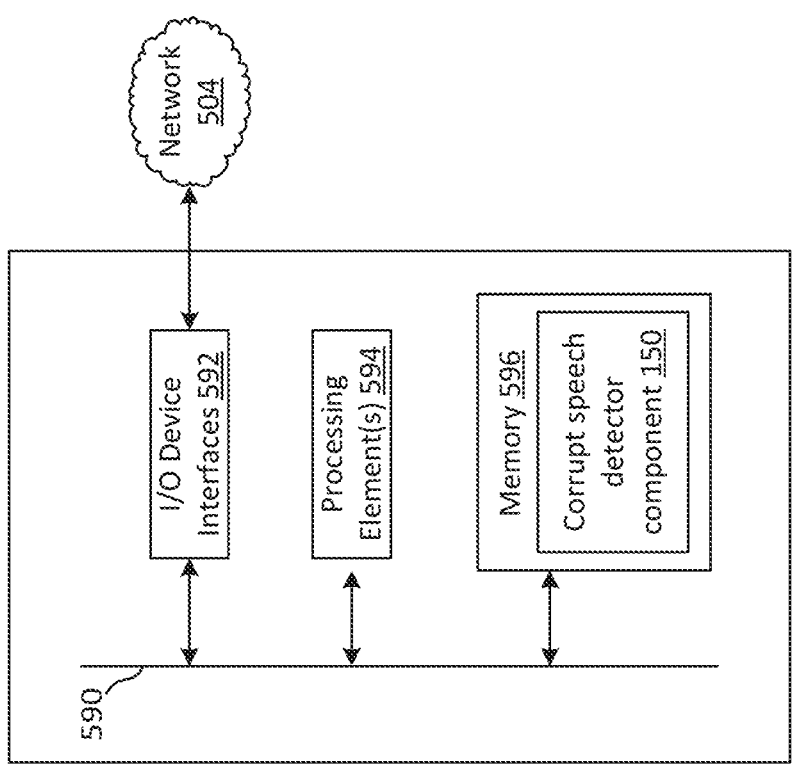
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows, when loaded from memory 596. In various further examples, memory 596 may be effective to store instructions effective to program controllers/processors 594 to perform the various techniques described above in reference to FIGS. 1-3B. Accordingly, in FIG. 5, corrupt speech detection component 150 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 120 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of a speech processing system may include input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
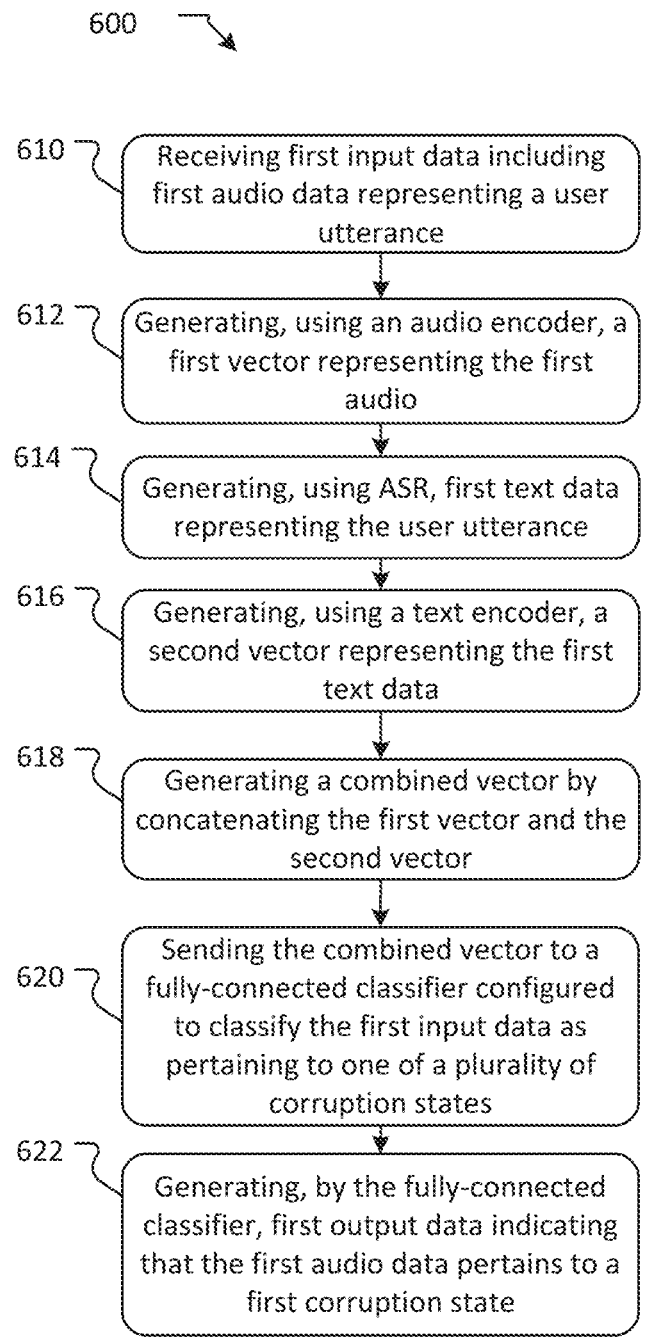
FIG. 6 depicts a flow chart showing an example process for detecting corrupted speech in natural language inputs, in accordance with various aspects of the present disclosure.

FIG. 6 depicts a flow chart showing an example process 600 for detecting corrupted speech in natural language inputs, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which a first input data including first audio data representing a user utterance may be received. For example, the first input data may be data representing a spoken user request (e.g., raw audio data received by one or more microphones of a natural language processing enabled device).

Processing may continue at action 612, at which an audio encoder may generate a first vector representing the first audio data. The audio encoder may be, for example, an RNN (such as an RNN-teacher model) trained to generate vector representations of input audio data. However, the particular audio encoder used may vary according to the desired implementation. The embeddings (e.g., the vectors) generated by the audio encoder may be learned for a classification task, such as generate a corruption state label, as described above.

Processing may continue at action 614, at which first text data may be generated using ASR (e.g., ASR component 250 of FIG. 2). The first text data may be the ASR-recognized speech (e.g., text representing the input utterance). The first text data may represent the top hypothesis for the input speech generated by ASR component 250 (e.g., the text transcription with the highest confidence score).

Processing may continue at action 616, at which a text encoder may be used to generate a second vector representing the first text data. Any desired text encoder that has been trained to generate a text embedding for the corrupt state label classification task may be used, in accordance with the desired implementation. For example, a pre-trained transformer-based language model (e.g., BERT, Roberta, etc.) and/or a recurrent neural network (e.g., an LSTM, RNN, etc.) may be used to generate the second vector that represents the ASR-recognized text data.

Processing may continue at action 618, at which a combined vector may be generated by concatenating the first vector and the second vector. It should be noted that the first vector and the second vector may be combined using other methods, as desired. For example, the audio embedding vector and the text embedding vector may instead be combined using a machine learning model (e.g., a fully-connected network) and/or may be combined mathematically by taking a per-element average of the vectors, by adding the vectors, by determining a difference vector, etc. The combined vector may represent both acoustic characteristics of the input speech as well as textual characteristics of the ASR-recognized text.

Processing may continue at action 620, at which the combined vector may be sent to a fully-connected classifier (e.g., one or more classifier layers of a machine learning model) that is configured to classify the first input data as pertaining to one of a plurality of corruption states. The fully-connected classifier may be trained as described above. In at least some examples, the encoders (e.g., the audio encoder and the text encoder of actions 612 and 616) may be trained in an end-to-end fashion together with the fully-connected classifier such that the embeddings are generated specifically for the classification task. The number of nodes in an output layer of the fully-connected classifier may, in some examples, correspond to the number of distinct corruption state labels (e.g., a garbled audio state, a media speech state, a singing state, a cross talk state, an uncorrupted state, etc.) that are desired. Accordingly, an output layer (e.g., Softmax) may be used to generate respective scores for each corruption state label (with each corruption state label corresponding to a respective node in the output layer) and the node with the highest score (or lowest score, depending on the implementation) may be selected as the predicted corruption state for the first input data.

Processing may continue at action 622, at which the fully-connected classifier may generate first output data indicating that the first audio data pertains to a first corruption state. The determination of which corruption state the first audio data pertains to may be determined as described above. In various examples, the first corruption state may, in turn, be used to determine further action. For example, a lookup may be performed using the first corruption state or the first corruption state may be input into a further machine learning model that may be used to determine the appropriate action to take. As an example, the first corruption state may be that the input audio included cross talk. The action to take may be to output a voice prompt to alert the user that it sounds like multiple people were speaking and that it was difficult to hear the request. The action may further prompt the user to repeat the request. In a different example, if the predicted corruption state indicates that there is media speech, the action may be to inform the user that it sounds like there is another device that is creating interfering audio. The action may further request that the user turn down or pause the device and repeat their request. These are merely examples of actions that may be taken. The specific actions may vary from implementation to implementation.

Figure 7:
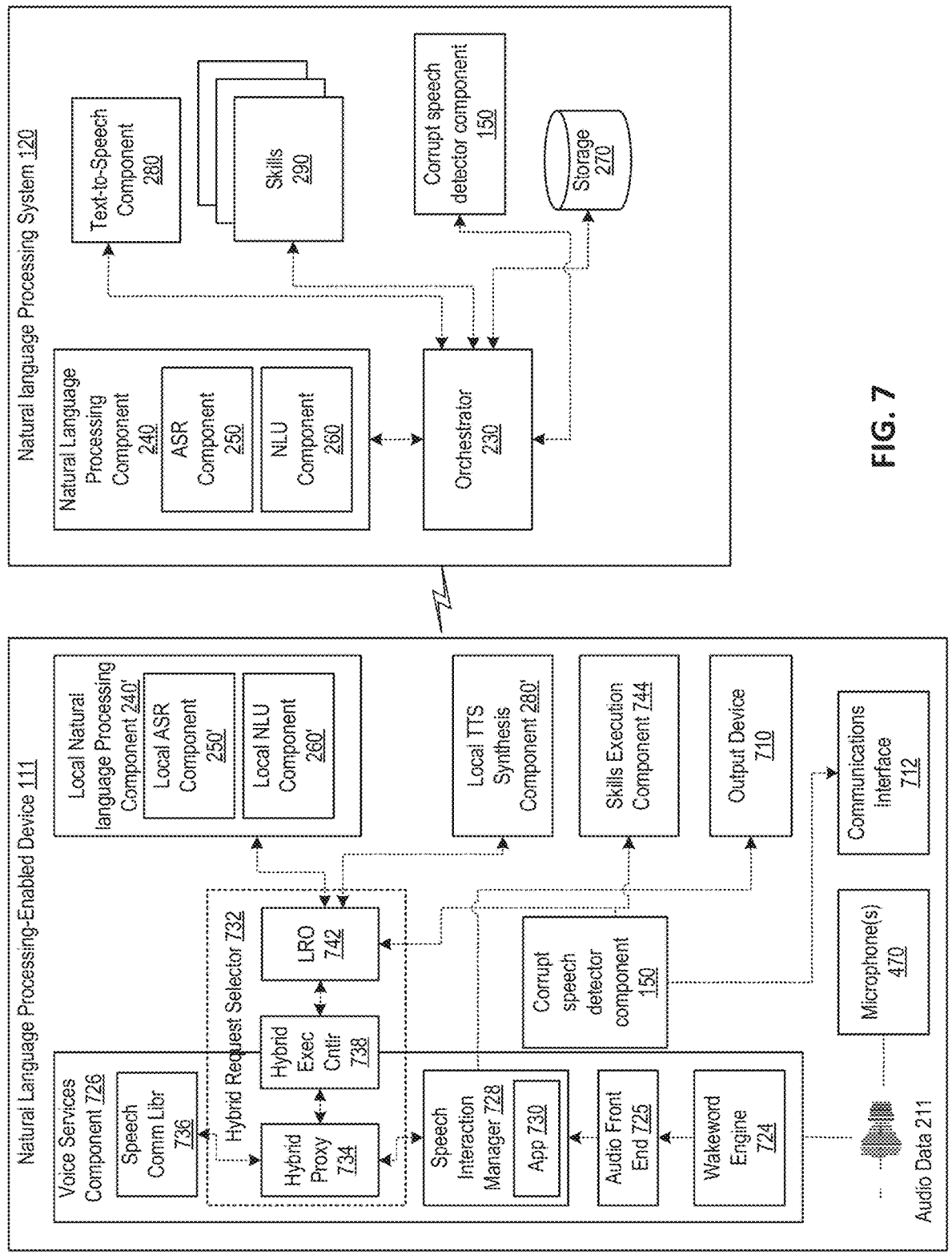
FIG. 7 is a block diagram illustrating a natural language processing-enabled device and a natural language processing management system, in accordance with embodiments of the present disclosure.

FIG. 7 is a block diagram illustrating a device 111 (e.g., a natural language processing enabled device) and a natural language processing system 120, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) the network-connected devices. Natural language processing may then be performed, either locally by the natural language processing components of device 111, by one or more other computing devices communicating with the device 111 over a network (e.g., natural language processing system 120), or by some combination of the device 111 and the one or more other computing devices. In various examples, device 111 may include and/or may be configured in communication with output device(s) 710 (e.g., speakers, displays, and/or other network connected devices among network-connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with corrupt speech detection component 150. Accordingly, the device 111 may detect corrupted speech and/or partially corrupted speech and may perform a corresponding action (e.g., informing the user of the issue in understanding and/or "hearing" the speech and request that the user repeats the request and/or remediates the interference).

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 712) from another device in the environment. In various examples, the device 111 may capture video and/or other image data using a camera. Under normal conditions, the device 111 may operate in conjunction with and/or under the control of a remote, network-based or network-accessible natural language processing system 120. The natural language processing system 120 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 120 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 120 may be configured to receive audio data 211 from the device 111, to recognize speech in the received audio data 211, and to perform functions in response to the recognized speech. In some embodiments, these functions involve sending a command, from the natural language processing system 120, to the device 111 to cause the device 111 to perform an action, such as output an audible response to the user speech via output device 710 (e.g., one or more loudspeakers). Thus, under normal conditions, when the device 111 is able to communicate with the natural language processing system 120 over a WAN (e.g., the Internet), some or all of the functions capable of being performed by the natural language processing system 120 may be performed by sending a command over a WAN to the device 111, which, in turn, may process the command for performing actions. For example, the natural language processing system 120, via a remote command that is included in remote response data, may instruct the device 111 to output an audible response (e.g., using a local text-to-speech (TTS) synthesis component 280) to a user's question, to output content (e.g., music) via output device 710 (e.g., one or more loudspeakers) of the device 111, or to control other devices in the local environment (e.g., the user's home). It is to be appreciated that the natural language processing system 120 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 726. When a user utterance including the wakeword is captured by the microphone 470 of the device 111, the audio data 211 representing the utterance is received by a wakeword engine 724 of the voice services component 726. The wakeword engine 724 may be configured to compare the audio data 211 to stored models used to detect a wakeword (e.g., "Computer") that indicates to the device 111 that the audio data 211 is to be processed for determining an intent. Thus, the wakeword engine 724 is configured to determine whether a wakeword is detected in the audio data 211, and, if a wakeword is detected, the wakeword engine 724 can proceed with routing the audio data 211 to an audio front end (AFE) 725 (sometimes referred to as an acoustic front end (AFE)) of the voice services component 726. If a wakeword is not detected in the audio data 211, the wakeword engine 724 can refrain from sending the audio data 211 to the AFE 725, thereby preventing the audio data 211 from being further processed. The audio data 211 can be discarded.

The AFE 725 is configured to transform the audio data 211 received from the wakeword engine 724 into data for processing by a suitable ASR component and/or NLU component. The AFE 725 may reduce noise in the audio data 211 and divide the digitized audio data 211 into frames representing a time intervals for which the AFE 725 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 725 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 725 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 725 in beamforming, may be determined based on results of the wakeword engine 724's processing of the audio data 211. For example, the wakeword engine 724 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 728 of the voice services component 726 may receive the audio data 211 that has been processed by the AFE 725. The SIM 728 may manage received audio data 211 by processing request data and non-speech noise or sounds as events, and the SIM 728 may also manage the processing of commands that are used to respond to the user speech or non-speech noise or sounds (e.g., by controlling the action(s) of natural language processing components of device 111). The SIM 728 may include one or more client applications 730 for performing various functions at the device 111.

A hybrid request selector component 732 of the device 111 is shown as including a hybrid proxy component (HP) 734, among other components. The HP 734 can be implemented as a layer within the voice services component 726 that is located between the SIM 728 and a speech communication library (SCL) 736, and may be configured to proxy traffic to/from the natural language processing system 120. For example, the HP 734 may be configured to pass messages between the SIM 728 and the SCL 736 (such as by passing events and instructions there between), and to send messages to/from a hybrid execution controller component (HEC) 738 of the hybrid request selector component 732. For instance, command data received from the natural language processing system 120 can be sent to the HEC 738 using the HP 734, which sits in the path between the SCL 736 and the SIM 728. The HP 734 may also be configured to allow audio data 211 received from the SIM 728 to pass through to the natural language processing system 120 (via the SCL 736) while also receiving (e.g., intercepting) this audio data 211 and sending the received audio data 211 to the HEC 738 (sometimes via an additional SCL).

As will be described in more detail below, the HP 734 and the HEC 738 are configured to perform a handshake procedure to connect to each other. As part of this handshake procedure, the HP 734 and the HEC 738 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 738 determines whether to accept or reject the connection request from the HP 734. If the HEC 738 rejects the HP's 734 connection request, the HEC 738 can provide metadata to the HP 734 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 732 may further include a local request orchestrator component (LRO) 742. The LRO 742 is configured to notify the local natural language processing component 240' about the availability of new audio data 211 that represents user speech, and to otherwise initiate the operations of the local natural language processing component 240' when new audio data 211 becomes available. In general, the hybrid request selector component 732 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 120 and chooses to use that remotely-generated command data.

The LRO 742 may interact with a skills execution component 744 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 724, which detects the wakeword "Computer," and forwards the audio data 211 to the SIM 728 via the AFE 725 as a result of detecting the wakeword. The SIM 728 may send the audio data 211 to the HP 734, and the HP 734 may allow the audio data 211 to pass through to the natural language processing system 120 (e.g., via the SCL 736), and the HP 734 may also input the audio data 211 to the local natural language processing component 240' by routing the audio data 211 through the HEC 738 of the hybrid request selector 732, whereby the LRO 742 notifies the local natural language processing component 240' of the incoming audio data 211. At this point, the hybrid request selector 732 may wait for response data from the natural language processing system 120 and/or the local natural language processing component 240'.

The local natural language processing component 240' is configured to receive the audio data 211 from the hybrid request selector 732 as input, to recognize speech (and/or non-speech audio events) in the audio data 211, to determine an intent (e.g., user intent) from the recognized speech (or non-speech audio event). This intent can be provided to the skills execution component 744 via the LRO 742, and the skills execution component 744 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 744 (and/or the natural language processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 744) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 120 for processing. As described above, the device 111 may capture audio using the microphone 470, and send audio data 211 (e.g., representing a spoken user request), corresponding to the captured audio, to the natural language processing system 120. The device 111 may include a wakeword detection component that detects when input audio includes a spoken wakeword, and when the wakeword is detected, the audio data 211 is sent by the device 111 to the natural language processing system 120. In various examples, the natural language processing system may be effective to detect other triggering audio events besides a wakeword. For example, a natural language processing system may be used in association with a security system. When the security system is armed the natural language processing system may listen for glass breaking noises, footsteps, talking, etc., in order to generate an alert and/or to trigger one or more other actions. In some other examples, functionality one or more devices may be controlled based on audio detected by one or more devices. For example, audio may be used to determine user presence which may affect device controls (e.g., allowing music playback to transition between different devices based on user presence). In general, the various techniques described herein may be used to determine a device that most clearly detects audio (e.g., the closest device to an audio source). However, in some cases, the closest device may not be selected by the techniques described herein (e.g., where a microphone of the closest device is covered (e.g., a towel laid on top of a device may muffle the input signal detected by the device's microphone) and does not receive a clear input audio signal).

Upon receipt by the natural language processing system 120, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 120) to complete the intent. For example, if the text data corresponds to "Play the new album by [Musical_Artist]", the NLU component 260 may determine the user intended to invoke a music playback intent to play the identified album.

The natural language processing system 120 may include a non-transitory computer-readable memory storage 270, storing various instructions for operation of the natural language processing system 120. As previously described, in some examples, the corrupt speech detection component 150 may be instantiated as a part of the natural language processing system 120 and/or as a separate component configured in communication with the natural language processing system 120.

As described above, the natural language processing system 120 may include one or more skill components 290. The natural language processing system 120 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 120 and the device 111 described herein may be implemented in software, hardware, firmware, or some combination thereof.

The natural language processing system 120 may reside on device 111, in a cloud computing environment, or some combination thereof. For example, the device 111 may include computing equipment, some portion of which is configured with some or all of the components or functionality of natural language processing system 120 and another portion of which is configured with some or all of the components or functionality of computing device(s) used in natural language processing system 120. The device 111 may then perform a variety of functions on its own (such as when remote communications are unavailable), and/or may communicate (when capable) with computing device(s) and/or the natural language processing system 120 to perform other functions. Alternatively, all of the functionality may reside on the device 111 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
    receiving first input data comprising first audio data representing a user utterance;
    generating, using a recurrent neural network-based audio encoder, a first vector representing the first audio data;
    generating, by inputting the first audio data into an automatic speech recognition (ASR) component, first text data representing the user utterance;
    generating, using a pre-trained transformer-based language model, a second vector representing the first text data;
    generating a combined vector by concatenating the first vector and the second vector, wherein the combined vector represents acoustic characteristics and textual characteristics of the first input data;

sending the combined vector to a fully-connected classifier configured to classify the first input data as pertaining to one of a plurality of corruption states;
generating, using the fully-connected classifier, first output data indicating that the first audio data pertains to a first corruption state of the plurality of corruption states; and
generating second output data indicating that the first audio data was not clearly received due to the first corruption state.

2. The method of claim 1, further comprising:
determining that a word count of the first text data generated by the ASR component is less than a threshold word count; and
determining that the first corruption state is applicable further based on the word count being less than the threshold word count.

3. The method of claim 1, further comprising:
determining that the first corruption state indicates that the first audio data was corrupted by playback from a media device, wherein the second output data comprises a request that playback volume of the media device be reduced or that playback of the media device be paused before repeating the user utterance.

4. The method of claim 1, further comprising:
receiving second input data comprising second audio data representing a second user utterance;
generating, using the recurrent neural network-based audio encoder, a third vector representing the second audio data;
generating, by inputting the second audio data into the ASR component, second text data representing the second user utterance;
generating, using the pre-trained transformer-based language model, a fourth vector representing the second text data;
generating a second combined vector by concatenating the third vector and the fourth vector, wherein the second combined vector represents acoustic characteristics and textual characteristics of the second input data;
sending the second combined vector to the fully-connected classifier;
generating, by the fully-connected classifier, third output data indicating that a first portion of the second audio data pertains to the first corruption state and that a second portion of the second audio data pertains to a second corruption state, wherein the second corruption state corresponds to uncorrupted audio; and
generating fourth output data requesting clarification for the first portion of the second audio data.

5. A method comprising:
receiving first input data comprising first audio data representing a user utterance;
generating, using a first encoder, first data representing the first audio data;
generating, using an automatic speech recognition (ASR) component, first text data representing a transcription of the user utterance;
generating, using a second encoder different from the first encoder, second data representing the first text data;
generating third data by combining the first data and the second data;
sending the third data to a classifier network, wherein the classifier network is trained to predict a relevant corruption state for input speech audio; and
determining, by the classifier network, that the first audio data corresponds to a first corruption state.

6. The method of claim 5, further comprising:
training the classifier network using:
a first training instance comprising:
second input data comprising second audio data representing a second user utterance and second text data representing the second user utterance; and
a corruption state label labeling the second input data as corresponding to the first corruption state.

7. The method of claim 6, wherein the first corruption state indicates that the second audio data comprises at least one of cross talk or media speech played back from a device.

8. The method of claim 5, further comprising:
determining a first response based on the first corruption state, the first response indicating that the user utterance could not clearly be understood in the first audio data; and
generating second audio data including the first response.

9. The method of claim 5, wherein the first corruption state is determined for a first portion of the user utterance, the method further comprising:
determining, for a second portion of the user utterance, a second corruption state indicating that the second portion of the user utterance is uncorrupted;
determining, using a natural language understanding component, first intent data representing the second portion of the user utterance; and
determining that the first intent data corresponds to a first speech processing domain.

10. The method of claim 9, further comprising generating an output audio prompt requesting clarification of a requested action of the user utterance for the first speech processing domain.

11. The method of claim 5, further comprising:
receiving second input data comprising second audio data representing a second user utterance;
generating, using the ASR component, second text data representing a second transcription of the second user utterance;
generating modified input data comprising the second text data and a phrase comprising at least one masked term; and
generating a prediction by a generative language model of the at least one masked term.

12. The method of claim 11, wherein the prediction classifies the second user utterance as intelligible or unintelligible.

13. A system comprising:
at least one processor; and
non-transitory computer-readable memory storing instructions that, when executed by the at least one processor, are effective to:
receive first input data comprising first audio data representing a user utterance;
generate, using a first encoder, first data representing the first audio data;
generate, using an automatic speech recognition (ASR) component, first text data representing a transcription of the user utterance;
generate, using a second encoder different from the first encoder, second data representing the first text data;
generate third data by combining the first data and the second data;

send the third data to a classifier network, wherein the classifier network is trained to predict a relevant corruption state for input speech audio; and determine, by the classifier network, that the first audio data corresponds to a first corruption state.

14. The system of claim 13, the non-transitory computer-readable memory storing further instructions that, when executed by the at least one processor, are further effective to:

train the classifier network using:
a first training instance comprising:
second input data comprising second audio data representing a second user utterance and second text data representing the second user utterance; and
a corruption state label labeling the second input data as corresponding to the first corruption state.

15. The system of claim 14, wherein the first corruption state indicates that the second audio data comprises at least one of cross talk or media speech played back from a device.

16. The system of claim 13, the non-transitory computer-readable memory storing further instructions that, when executed by the at least one processor, are further effective to:

determine a first response based on the first corruption state, the first response indicating that the user utterance could not clearly be understood in the first audio data; and
generate second audio data including the first response.

17. The system of claim 13, the non-transitory computer-readable memory storing further instructions that, when executed by the at least one processor, are further effective to:

determine, for a second portion of the user utterance, a second corruption state indicating that the second portion of the user utterance is uncorrupted;
determine, using a natural language understanding component, first intent data representing the second portion of the user utterance; and
determine that the first intent data corresponds to a first speech processing domain.

18. The system of claim 17, the non-transitory computer-readable memory storing further instructions that, when executed by the at least one processor, are further effective to:

generate an output audio prompt requesting clarification of a requested action of the user utterance for the first speech processing domain.

19. The system of claim 13, the non-transitory computer-readable memory storing further instructions that, when executed by the at least one processor, are further effective to:

receive second input data comprising second audio data representing a second user utterance;
generate, using the ASR component, second text data representing a second transcription of the second user utterance;
generate modified input data comprising the second text data and a phrase comprising at least one masked term; and
generate a prediction by a generative language model of the at least one masked term.

20. The system of claim 19, wherein the prediction classifies the second user utterance as intelligible or unintelligible.

* * * * *